United States Patent
Basak et al.

(10) Patent No.: US 11,243,874 B2
(45) Date of Patent: Feb. 8, 2022

(54) KNOWLEDGE CENTRIC APPROACH TO AUTO-GENERATE TEST SPECIFICATIONS FOR IOT SOLUTIONS

(71) Applicant: Tata Consultancy Services Limited, Mumbai (IN)

(72) Inventors: Barnali Basak, Pune (IN); Subhrojyoti Roy Chaudhuri, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/021,637

(22) Filed: Sep. 15, 2020

(65) Prior Publication Data
US 2021/0303453 A1    Sep. 30, 2021

(30) Foreign Application Priority Data
Mar. 31, 2020   (IN) .............................. 202021014241

(51) Int. Cl.
*G06F 9/44*      (2018.01)
*G06F 11/36*     (2006.01)
(Continued)

(52) U.S. Cl.
CPC ...... *G06F 11/3688* (2013.01); *G06F 11/3676* (2013.01); *G06N 5/003* (2013.01); *G16Y 30/10* (2020.01)

(58) Field of Classification Search
None
See application file for complete search history.

(56) References Cited

U.S. PATENT DOCUMENTS

| 8,707,263 B2 | 4/2014 | Osenkov et al. |
| 8,751,093 B2 | 6/2014 | FarnsWorth et al. |

(Continued)

FOREIGN PATENT DOCUMENTS

CN    106528410 A    3/2017

OTHER PUBLICATIONS

Salihbegovic et al., Design of a domain specific language and IDE for Internet of things applications, MIPRO 2015 (Year: 2015).*
(Continued)

*Primary Examiner* — Insun Kang
(74) *Attorney, Agent, or Firm* — Finnegan, Henderson, Farabow, Garrett & Dunner, LLP

(57) ABSTRACT

This disclosure relates generally to a system and method for auto-generation of test specifications from internet of things (IoT) solution specifications of IoT-enabled components of an IoT network. Testing is the complementary and most important part of any IoT network. Herein, a domain specific language (DSL) is used to specify capability of IoT enabled components. IoT solution specifications are captured from capabilities of IoT enabled components using a predefined activity DSL. A flow of activity is captured to assert transitions among one or more activities based on guard conditions. The flow of activity is analyzed to generate test specifications automatically using a Test Specification DSL based on the asserted transitions. The test specifications are implemented automatically in a predefined target language corresponding to the IoT enabled components.

11 Claims, 3 Drawing Sheets

(51) Int. Cl.
*G06N 5/00* (2006.01)
*G16Y 30/10* (2020.01)

(56) References Cited

U.S. PATENT DOCUMENTS

| | | | | |
|---|---|---|---|---|
| 10,810,110 | B1* | 10/2020 | Thomas | G06F 11/3688 |
| 2010/0175052 | A1 | 7/2010 | Prasad et al. | |
| 2013/0159963 | A1* | 6/2013 | Dhalait | G06F 11/3684 717/104 |
| 2014/0282407 | A1* | 9/2014 | Channamsetti | G06F 11/3688 717/124 |
| 2018/0189168 | A1* | 7/2018 | Dwarakanath | G06F 11/3684 |
| 2019/0272227 | A1* | 9/2019 | Alam | G06F 11/3684 |
| 2019/0303279 | A1* | 10/2019 | Tritchkov | G06F 11/3688 |
| 2020/0065210 | A1* | 2/2020 | Idrisov | G06F 11/3452 |
| 2020/0285568 | A1* | 9/2020 | Alff | G06F 11/3692 |
| 2021/0232494 | A1* | 7/2021 | Chatterjee | G06F 11/3692 |
| 2021/0294734 | A1* | 9/2021 | Stump | G06F 11/3688 |

OTHER PUBLICATIONS

Lopez et al., A DSL for Web Services Automatic Test Data Generation, Copyright 2013 ACM (Year: 2013).*
Bernardino et al., Canopus: A Domain-Specific Language for Modeling Performance Testing, IEEE 2016 (Year: 2016).*
Verriet et al., Virtual Prototyping of Large-scale IoT Control Systems using Domain-specific Languages, Copyright 2019 by SCITEPRESS (Year: 2019).*
Olajubu et al., Automated test case generation from domain specific models of high-level requirements, ACM, 2015 (Year: 2015).*
Im et al., Automating Test Case Definition Using a Domain Specific Language, ACM, 2008 (Year: 2008).*
González García et al., Midgar: Generation of heterogeneous objects interconnecting applications. A Domain Specific Language proposal for Internet of Things scenarios, 2014 Elsevier B.V. (Year: 2014).*
Alulema et al., A DSL for the development of heterogeneous applicaitons, IEEE 2017 (Year: 2017).*

* cited by examiner

KNOWLEDGE CENTRIC APPROACH TO AUTO-GENERATE TEST SPECIFICATIONS FOR IOT SOLUTIONS

CROSS-REFERENCE TO RELATED APPLICATIONS AND PRIORITY

This U.S. patent application claims priority under 35 U.S.C. § 119 to India Application No. 202021014241, filed on Mar. 31, 2020. The entire contents of the abovementioned application are incorporated herein by reference.

TECHNICAL FIELD

The present subject matter relates in general to the field of auto-generation of test specifications from Internet of Things (IoT) solution specification, and in particular, system and method for auto-generation of test specifications from IoT solution specifications of IoT enabled components of an IoT network.

BACKGROUND

In the field of Internet of Things (IoT) network like smart city, smart house, IoT enabled medical devices etc., huge number of IoT enabled components are interconnected and orchestrated in such a manner that the end-user objective is fulfilled. As the number of IoT components grow the functionality of the overall solution becomes complex in nature. Designing an IoT solution requires knowledge and expertise from different stakeholders like end users to specify the user requirements, domain experts to lend their domain knowledge, software architectures to design the solution, software developers to implement the IoT solution.

Testing is the complementary and most important part of any IoT solution development. However, traditionally development and testing are considered independent where developers do not care much about testing and testers take a black-box view of the system while generating test specifications. Due to the conglomerate nature of IoT components and the complexity involved in IoT system, it is impossible to generate the test specifications using black-box approach. This requires deep understanding of the domain, knowledge about the IoT enabled components involved, workings of the software and its implementation details, deployment environment of the system etc. Manual generation of test specifications for IoT enabled components require huge effort and iterations of interactions among different stakeholders. This process is cumbersome and may quickly become complex, tedious and untraceable. The growing field of IoT systems lacks the support to automatically generate test specifications to check correctness of the IoT solutions.

SUMMARY

Embodiments of the present disclosure present technological improvements as solutions to one or more of the above-mentioned technical problems recognized by the inventors in conventional systems. Herein, in one embodiment, a processor-implemented method for auto-generation of test specifications from IoT solution specifications of IoT-enabled components is provided.

The processor-implemented method comprising receiving a plurality of data pertaining to capability of one or more internet of things (IoT) enabled components using a predefined domain specific language (DSL), capturing at least one IoT solution specification as flow of activities comprising of capability of each of the one or more IoT enabled components using a predefined activity DSL. Herein, a flow of activity is captured to assert transitions among one or more activities based on guard conditions. It would be appreciated that the guard condition comprises of one or more predefined conditions and are connected with one or more logical operators.

Furthermore, the processor-implemented method includes deriving one or more distinct sequence of activities automatically based on a predefined guard condition from the captured at least one flow of activity of the IoT solution specification. Herein, the predefined guard condition comprises of one or more conditions composed by at least one logical operator and checking for any missing solution specification. Furthermore, the processor-implemented method includes generating one or more test specifications for each of one or more sequence of activities in form of Test Specification DSL based on the asserted transitions of the captured at least one flow of activity of solution specification. It would be appreciated that the one or more test specifications comprises of start activity of the activity path, end activity of the activity path, sequence of activities present in the ordered path, values of parameters asserting guard conditions and outputs.

In another aspect, a system for auto-generation of test specifications from IoT solution specifications of IoT-enabled components is provided. The system includes at least one user interface, at least one memory storing a plurality of instructions, and one or more hardware processors communicatively coupled with at least one memory, wherein one or more hardware processors are configured to execute one or more modules. Further, the system includes a receiving module configured to receive a plurality of data pertaining to capability of one or more internet of things (IoT) enabled components using a predefined domain specific language (DSL). Herein, the plurality of data is related to capability of each of the one or more IoT enabled components and is stored as a knowledge.

Furthermore, the system includes a capturing module configured to at least one IoT solution specification as flow of activities comprising of capability of each of the one or more IoT enabled components using a predefined activity DSL. Further, a driving module of the system is configured to derive one or more distinct sequence of activities automatically based on a predefined guard condition from the captured at least one flow of activity of the IoT solution specification. Herein, the predefined guard condition comprises of one or more conditions composed by at least one logical operator and checking for any missing solution specification. Finally, the system comprises a generating module configured to generate one or more test specifications for each of one or more sequence of activities in form of Test Specification DSL based on the asserted transitions of the captured at least one flow of activity of solution specification. It would be appreciated that the one or more test specifications consist of start activity of the activity path, end activity of the activity path, sequence of activities present in the ordered path, values of parameters asserting guard conditions and outputs.

In yet another embodiment, a non-transitory computer readable medium storing one or more instructions which when executed by a processor on a system to cause the processor to perform method. The processor-implemented method comprising receiving a plurality of data pertaining to capability of one or more internet of things (IoT) enabled components using a predefined domain specific language (DSL), capturing at least one IoT solution specification as flow of activities comprising of capability of each of the one or more IoT enabled components using a predefined activity DSL. Herein, a flow of activity is captured to assert transitions among one or more activities based on guard conditions. It would be appreciated that the guard condition comprises of one or more predefined conditions and are connected with one or more logical operators.

Furthermore, the processor-implemented method includes deriving one or more distinct sequence of activities automatically based on a predefined guard condition from the captured at least one flow of activity of the IoT solution specification. Herein, the predefined guard condition comprises of one or more conditions composed by at least one logical operator and checking for any missing solution specification. Furthermore, the processor-implemented method includes generating one or more test specifications for each of one or more sequence of activities in form of Test Specification DSL based on the asserted transitions of the captured at least one flow of activity of solution specification. It would be appreciated that the one or more test specifications comprises of start activity of the activity path, end activity of the activity path, sequence of activities present in the ordered path, values of parameters asserting guard conditions and outputs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
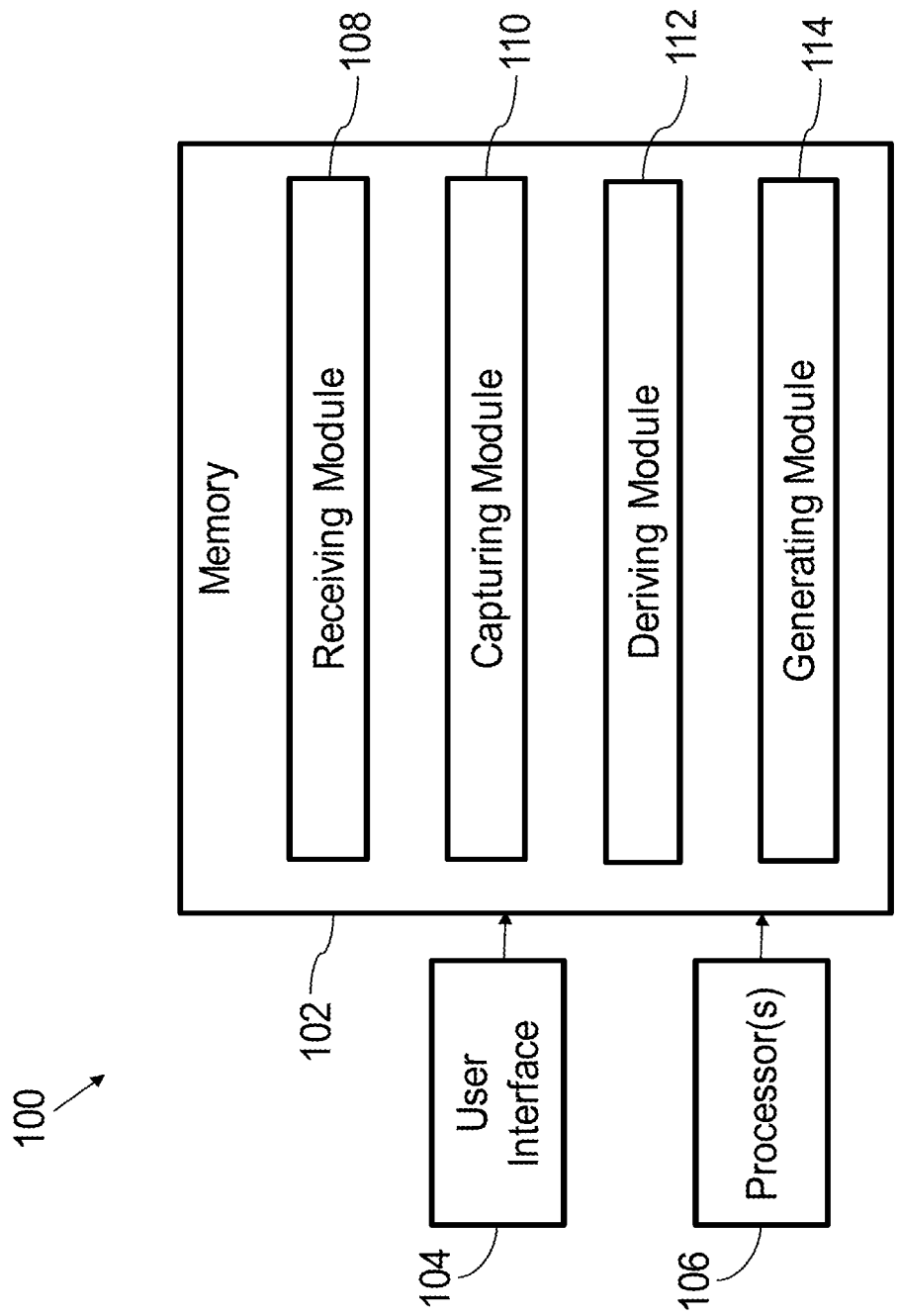
FIG. 1 illustrates an exemplary system for auto-generation of test specifications from abstracted solution specification comprising of IoT-enabled components according to some embodiments of the present disclosure.
Figure 2:
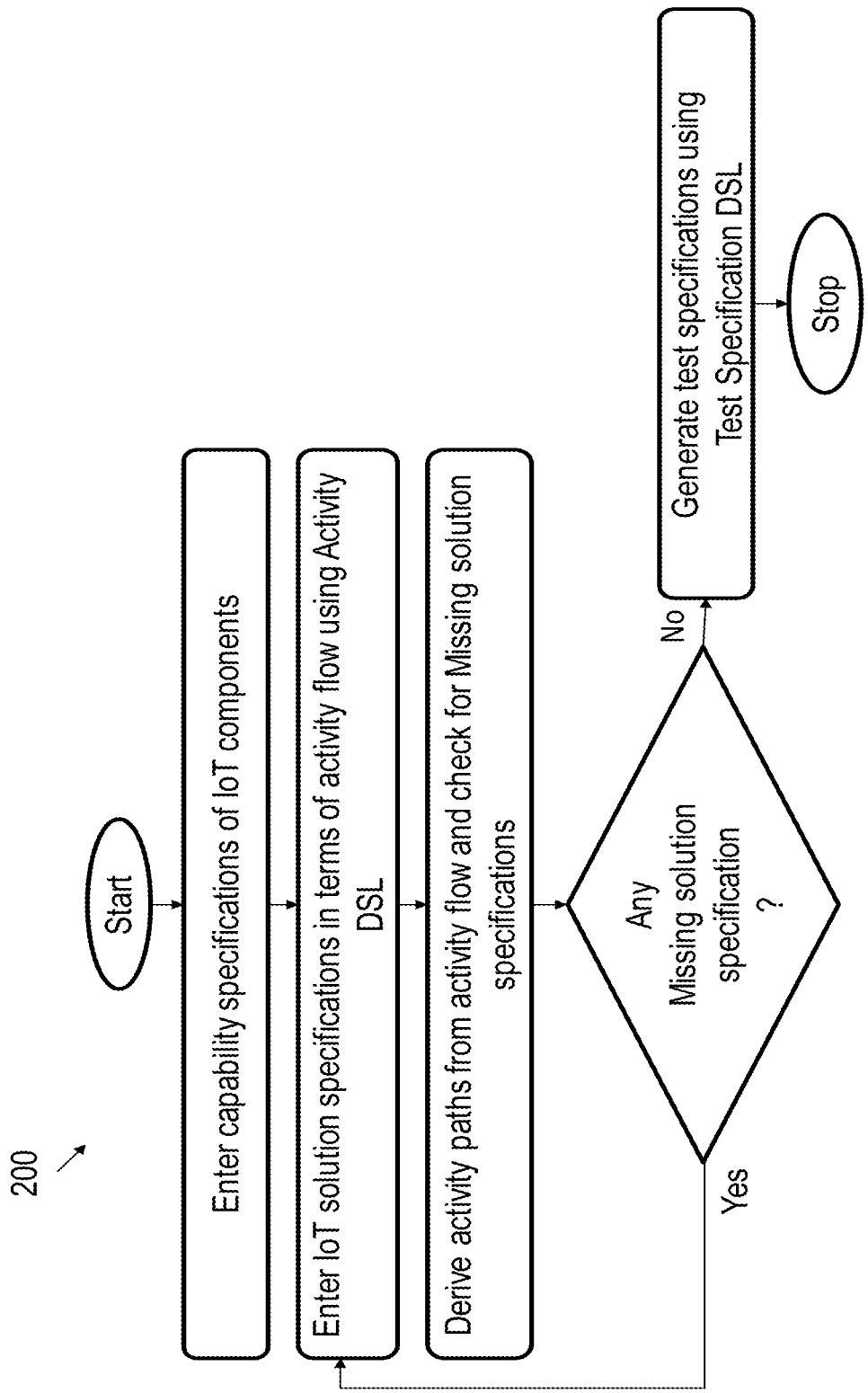
FIG. 2 is a flow diagram showing usage flow of the system in accordance with some embodiments of the present disclosure.
Figure 3:
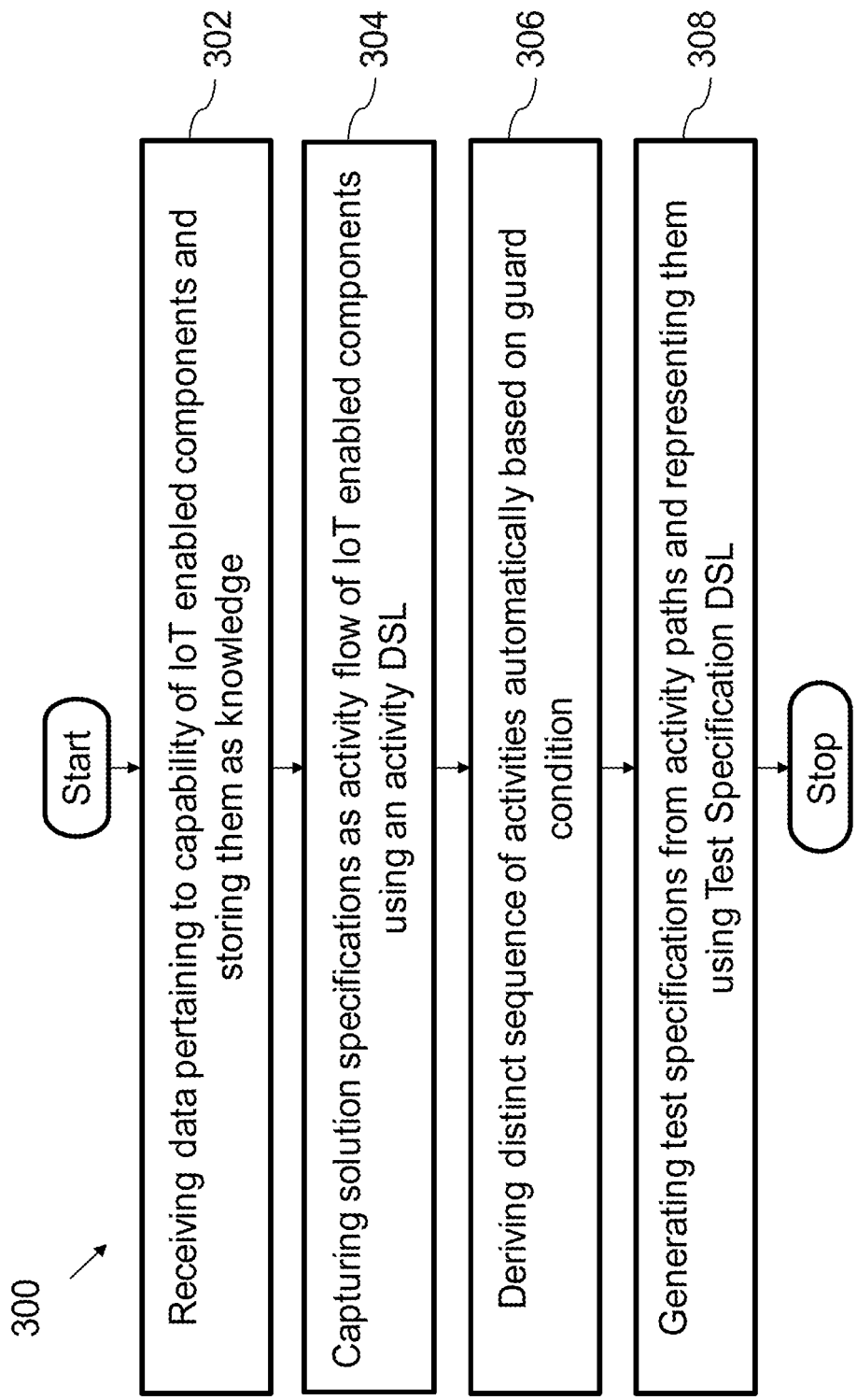
FIG. 3 is a flow diagram illustrating auto-generation of test specifications from abstracted solution specification of IoT-enabled components in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

The embodiments herein provide a system and method for auto-generation of test specifications from the IoT solution specification of IoT-enabled components. Auto-generation of test specifications is to check correctness of the IoT enabled components. Herein, domain specific languages (DSL) are used to specify capability of IoT enabled components, stored as knowledge, and an activity flow to capture IoT solution, to automatically derive one or more test specifications in another DSL to test the solution extensively and finally generating the one or more test specifications to deploy the test specifications. The system is configured to analyze the solution specifications provided as activity flow using the predefined activity DSL and to give feedback to a stakeholder regarding one or more missing IoT solution specifications. It is to be noted that the one or more test specifications are represented using a Test Specification DSL.

In one embodiment, referring FIG. 1, illustrating a system (100) for auto-generation of test specifications from the IoT solution specification of IoT-enabled components. In the preferred embodiment, the system (100) comprises at least one memory (102) with a plurality of instructions, at least one user interface (104) and one or more hardware processors (106). It is to be noted that the one or more hardware processors (106) are communicatively coupled with the at least one memory (102) to execute modules therein.

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102). Further, the system comprises a receiving module (108), a capturing module (110), a deriving module (112), and a generating module (114).

In the preferred embodiment of the disclosure, the receiving module (108) of the system (100) is configured to receive a plurality of data pertaining to capability of one or more internet of things (IoT) enabled components using a predefined domain specific language (DSL). Herein, the plurality of data is related to capability of each of the one or more IoT enabled components. It is presumed that the received capability of each of the one or more IoT enabled components is correct and is considered as knowledge.

It would be appreciated that in contrast to general programming languages like C, C++, Java etc., domain specific languages (DSL) are developed to address only domain specific solutions. Herein, to capture IoT solution specifications for IoT enabled components, the predefined activity DSL is used that specifies activities and transitions among them based on some guard conditions. A guard condition is composed of one or more conditions comprises of one or more logical operators. The predefined activity DSL specifies activity transitions as follows:

<source activity>: {set of transition rules} wherein a transition rule is defined as follows,

If <guard_condition> then return <output> and goto <target activity>. Hence, output represents either the data generated as output by the activity or the state of completion of the activity.

In one example, wherein State, Event, Alarm, DataIn and DataOut are one or more attributes used to capture capability of an IoT enabled component. State captures state of an IoT enabled component. Given an event, Event captures the response of an IoT enabled component as the event occurs.

Alarm is used to notify user about an erroneous state of an IoT enabled component. DataIn and DataOut represent data input to and data output from an IoT enabled component respectively. As instance the capability of an IoT enabled component boom-barrier can be captured as follows:

State(boom-barrier)={powered_on, powered_off, broken}
Event(boom-barrier, OPEN)={successful, unsuccessful}
Event(boom-barrier, CLOSE)={successful, unsuccessful}
Alarm(boom-barrier)={alarm_power_off, alarm_broken}

Herein, the boom-barrier has three states powered_on, powered_off and broken. Events OPEN and CLOSE are triggered to the boom-barrier and the event is either successful or unsuccessful. When the boom-barrier reaches erroneous states like powered_off and broken, the boom-barrier raises alarm_power_off and alarm_broken respectively. The boom-barrier component does not have data input and data output attributes.

In the preferred embodiment of the disclosure, the capturing module (110) of the system (100) is configured to capture at least one IoT solution specification as flow of activities comprising of capability of each of the one or more IoT enabled components using a predefined activity DSL. It would be appreciated that the flow of activity represents a sequence of one or more activities and transitions among activities based on guard conditions. Herein a guard condition comprises of one or more conditions along with one or more logical operators. It would be appreciated that the parameters used in guard conditions come from capability knowledge of each IoT enabled component.

Referring FIG. 2, as an example, to illustrate usage flow of the system. Herein, an activity flow of a weighing bridge scenario is illustrated. In the weighing bridge arrangement, on arrival of a Radio-frequency identification (RFID) tagged vehicle the RFID tag is first read by a RFID detector of the weighing bridge arrangement. If the RFID tag is valid then the information on the RFID tag is validated by a validator of the weighing bridge arrangement. If the RFID tag is invalid the RFID detector keeps detecting the RFID tag. Once the information of the RFID tag is validated a boom-barrier raises and the RFID tagged vehicle passes. If the information is not valid then an invalid vehicle error is returned by the weighing bridge arrangement and a control flows to tag detection activity. It is to be noted that if the boom-barrier raises successfully, it waits for ten seconds for the RFID vehicle to pass and then the boom-barrier closes. If the boom-barrier does not open or close successfully a gate error is returned by the weighing bridge arrangement. If the complete action flow is completed without any error the weighing bridge arrangement returns success and goes back to tag detection activity.

Further, the solution of a weighing bridge scenario is captured using the predefined activity DSL as follows:

```
activity Detection: {
    If State(Detector) = on AND DataIn(Detector) > 0 then goto activity Validation
    If State(Detector) = off then return detector_error
    If State(Detector) = on AND DataIn(Detector) <= 0 then return invalid_tag and goto activity Detection
}
activity Validation: {
    If State(Validator) = on AND DataIn(Validator) = valid then goto activity Gate_Open
    If State(Validator) = off then return validator_error
    If State(Validator) = on AND DataIn(Validator) = invalid then
```

-continued

```
    return inavlid_vehicle and goto activity Detection
}
activity Gate_Open:{
    If State(Gate) = powered_on AND Event(Gate,OPEN) = successful then
    wait(10s) and goto activity Gate_Close
    If State(Gate) = powered_off then return gate_powered_off
    If State(Gate) = powered_on AND Event(Gate, OPEN) = unsuccessful then return open_gate_error
}
activity Gate_Close : {
    If State(Gate) = powered_on AND Event(Gate,CLOSE) = successful then goto activity Detection
    If State(Gate) = powered_on AND Event(Gate,CLOSE) = unsuccessful then return close_gate_error
}
``` wherein, the weighing bridge scenario includes four activities; Detection that detects the Radio-frequency identification (RFID) tagged vehicle, Validation that validates the information of the RFID tagged vehicle, Gate_Open and Gate_Close that opens and closes the boom-barrier. Activity Detection specifies three transition rules where each transition rule has structure
If <guard_condition> then return <output> and goto <target activity>. For the transition:
If State(Detector)=on AND DataIn(Detector)>0 then goto activity Validation,
State(Detector)=on AND DataIn(Detector)>0 is the guard condition for transition from activity Detection to activity Validation. This guard condition comprises of multiple conditions State(Detector)=on, DataIn(Detector) >0 and is composed by logical operator AND.
Similarly for transition rule
If State(Detector)=off then return detector_error
the guard condition is State(Detector)=off and the output produced by the activity is detector_error.

In the preferred embodiment of the disclosure, the deriving module (112) of the system (100) is configured to derive one or more distinct sequence of activities automatically based on a predefined guard condition from the captured at least one flow of activity of the IoT solution specification. Herein, the predefined guard condition comprises of one or more conditions composed by at least one logical operator and checking for any missing solution specification. The one or more derived distinct sequence are activity paths. It is to be noted that the deriving module (112) of the system extracts an activity graph from the IoT solution specifications using the predefined activity DSL and explores the activity graph to derive one or more activity paths. It would be appreciated that the one or more activity paths comprises of transitions between activities. The one or more activity paths are either a cyclic path or an acyclic path.

It would be appreciated that the activity graph extracted from the predefined activity DSL is represented by a set of nodes and a set of edges connecting the set of nodes. Herein, each activity in the predefined activity DSL is considered as a node and the transitions between activities are considered as edges in the graph. In the activity graph, each edge is annotated by the guard condition triggering the activity transition and the output caused by the target activity of the transition between activities. It is to be noted that if the predefined activity DSL only provides output without specifying any activity transition, then a unique pseudo node is introduced, and the connecting edge is annotated with the output.

In another example, the activity graph derived from the IoT solution specifications using the predefined activity DSL is presented. The activity graph has set of nodes and set of edges where the set of nodes are connected by the set of edges. The set of nodes contain all the activities. The set of edges contain activity transitions where each edge is annotated by guard condition responsible for the activity transition and output produced by source activity of the transition. In this example the activity graph contains set of nodes as activities Detection, Validation, Gate_Open and Gate_Close. Below we present all annotated edges from the activity graph using colon separated form that separates edge, guard condition and output. Note that, if a transition rule does not specify any activity transition and only provides output then a unique pseudo-node is introduced such that the connecting edge from the source node to unique pseudo-node is annotated by the output. If a transition rule only specifies activity transition without producing any output, then the output is considered as null.

a) Detection→Validation: State(Detector)=on AND DateIn(Detector)>0: null
b) Detection→Fail1: State(Detector)=off: detector_error
c) Detection→Detection: State(Detector)=on AND DataIn(Detector)<=0: invalid tag
d) Validation→Gate_Open: State(Validator)=on AND DataIn(Validator)=valid: null
e) Validation→Fail2: State(Validator)=off: validator_error
f) Validation→Detection: State(Validator)=on AND DataIn(Validator)=invalid: invalid vehicle
g) Gate_Open→Gate_Close: State(Gate)=powered_on AND Event(Gate, OPEN)=successful: null
h) Gate_Open→Fail3: State(Gate)=powered_off: gate_powered_off
i) Gate_Open→Fail4: State(Gate)=powered_on AND Event(Gate, OPEN)=unsuccessful: open_gate_error
j) Gate_Close→Detection: State(Gate)=powered_on AND Event(Gate, CLOSE)=successful: null
k) Gate_Close→Fail5: State(Gate)=powered_on AND Event(Gate, CLOSE)=unsuccessful: close_gate_error Here Fail1, Fail2, Fail3, Fail4 and Fail5 are pseudo-nodes introduced to complete the activity graph.

Further, the deriving module (112) of the system (100) is configured to explore one or more activity paths from the activity graph using a predefined data flow analysis technique. Herein, from the source node to all destination nodes of the activity graph, the predefined data flow analysis generates one or more distinct activity paths, including an acyclic or a cyclic, where cycles are iterated only once.

In another example, wherein enumerating one or more distinct activity paths from a source node Detection to a destination node Validation of the activity graph for weighing bridge scenario using data flow analysis technique:

a) Detection→Validation
b) Detection→Detection→Validation
c) Detection→Validation→Detection→Validation
d) Detection→Validation→Detection→Detection→Validation
e) Detection→Detection→Validation→Detection→Validation
f) Detection→Detection→Validation→Detection→Detection→Validation
g) Detection→Validation→Gate_Open→Gate_Close→Detection→Validation
h) Detection→Validation→Gate_Open→Gate_Close→Detection→Detection→Validation
i) Detection→Validation→Gate_Open→Gate_Close→Detection→Validation→Detection→Validation
j) Detection→Validation→Gate_Open→Gate_Close→Detection→Validation→Detection→Detection→Validation
k) Detection→Validation→Gate_Open→Gate_Close→Detection→Detection→Validation→Detection→Validation
l) Detection→Validation→Gate_Open→Gate_Close→Detection→Detection→Validation→Detection→Detection→Validation In the preferred embodiment, the activity paths are analyzed with a modified condition decision coverage (MCDC) where one condition is modified at a time. In one example, wherein for a guard condition ((x==true) and (y==true)) the MCDC conditions are ((x==true) and (y==false)) and ((x==false) and (y==true)) where one condition is modified at a time. If for an MCDC covered condition any activity path is not identified, then a transition rule is missing in the given solution description and a feedback is sent to the user identifying the missing specification.

In one example, wherein for an activity path Detection→Validation the activity transition is triggered by a guard condition that comprises of predefined conditions State (Detector)=on and DataIn(Detector)>0 and the conditions are composed by logical operator AND. The MCDC covered conditions for this guard condition are State(Detector)=off AND DataIn(Detector)>0 and State(Detector)=on AND DataIn(Detector)<=0. Our method checks for transition rules for these MCDC covered conditions in the given solution specification. In the solution specification of weighing bridge scenario, both conditions are covered by the transition rules. If for a condition no transition rule is identified the feedback is sent to the user.

In the preferred embodiment of the disclosure, the generating module (114) of the system (100) is configured to generate one or more test specifications for each of one or more sequence of activities in form of Test Specification DSL based on the asserted transitions of the captured at least one flow of activity of solution specification. Herein, the test specifications are generated to perform gray box testing of the IoT solution specifications. The Gray-box testing is a combination of both black-box and white-box testing. In case of black box testing only the outputs of a system under testing is checked against the inputs without any knowledge of internal structure of the system. In case of white box testing the internal structure of the system under testing is completely known. However, for gray-box testing the internal structure of the system under testing is partially known.

It would be appreciated that the test specifications generated by the generating module (114) of the system (100) using test specification DSL asserts guard conditions of each activity path explored by the auto-derivation module from the activity graph. Each activity path is an ordered sequence of activities starting from the start activity and ending at the end activity. Each transition in the activity path is guided by the guard condition where one or more attributes of capability of one or more IoT enabled components are checked. Each edge in the activity path that represents transitions between activities is annotated by the guard condition responsible for the transition and output produced by the source activity of the transition.

In another aspect, each of the one or more test specifications presented using test specification DSL is comprised of start activity, set of parameter value pairs such that values for the parameters assert the guard conditions involved in an activity path, end activity, output and trace. Trace represents the activity path as the ordered sequence of activities. The test specification DSL is used to express test specifications as follows.

```
Test Specification <sequence number>:
{
    start activity : <activity>
    parameter value pairs : {set of <parameter value pair>}
    end activity : <activity>
    output : <output>
    trace : {ordered sequence of <activity>}
}
``` wherein start activity and end activity are of type activity, a parameter value pair capturing the parameter specified in guard condition and value from its acceptable range that satisfies the guard condition, system output of type output and trace that captures sequence of activities that the solution performs starting from start activity to end activity.

In an example, for an activity path Detection→Detection→Validation the generated test specification is represented below using test specification DSL, wherein test specification DSL specifies that given start activity Detection and input parameter value pairs as {(State(Detector), on), (DataIn(Detector), −1), (State(Validator), oft)} the system should produce output validator_error with end activity Validation and trace of activities as {Detection, Validation}.

```
Test Specification 1:
{
    start activity: Detection
    parameter value pairs: {(State(Detector), on),
    (DataIn(Detector), -1), (State(Validator), off)}
    end activity: Validation
    output: validator_error
    trace: {Detection, Validation}
}
```

Referring FIG. 3, a flow chart to illustrates a processor-implemented method (300) for auto-generation of test specifications from the IoT solution specification of IoT-enabled components. The method comprises one or more steps as follows.

Initially, at the step (302), a plurality of data pertaining to capability of one or more internet of things (IoT) enabled components is received using a predefined domain specific language (DSL). Herein, the plurality of data is related to capability of each of the one or more IoT enabled components. It is presumed that the received capability of each of the one or more IoT enabled components is correct and is considered as knowledge.

In the preferred embodiment of the disclosure, at the next step (304), capturing at least one flow of activity of IoT solution specifications of one or more IoT enabled components using a predefined activity DSL. It would be appreciated that the flow of activity represents a sequence of one or more activities and transitions among activities based on guard conditions. Herein a guard condition comprises of one or more conditions along with one or more logical operators. It would be appreciated that the parameters used in guard conditions come from capability knowledge of each IoT enabled component.

In the preferred embodiment of the disclosure, at the next step (306), the captured at least one flow of activity of the IoT solution specification is analyzed to derive one or more distinct sequence of activities automatically. Herein, the one or more derived distinct sequence are activity paths. It is to be noted that an activity graph is extracted from the IoT solution specifications using the predefined activity DSL and explores the extracted activity graph to derive one or more activity paths. Herein, the one or more activity paths comprises of a cyclic path or an acyclic path.

In the preferred embodiment of the disclosure, at the next step (308), generating one or more test specifications in form of Test Specification DSL for asserted transitions present in each of the one or more activity paths of activity graph. Herein, the test specifications are generated to perform gray box testing of the IoT solution specifications.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of auto-generation of test specifications from highly abstracted solution specification of various IoT enabled components of an IoT system. Manual generation of test specifications for IoT enabled components require huge effort and iterations of interactions among different stakeholders. The manual process is cumbersome and may quickly become complex, tedious and untraceable. Hence, the growing field of IoT lacks the support to automatically generate test specifications to check correctness of the system functionality.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
   receiving, via one or more hardware processors, a plurality of data pertaining to capability of one or more internet of things (IoT) enabled components using a predefined domain specific language (DSL);
   capturing, via one or more hardware processors, at least one IoT solution specification as flow of activities comprising of capability of each of the one or more IoT enabled components using a predefined activity DSL that specifies the activities and transitions among the activities based on a predefined guard condition, wherein the capturing asserts the transitions;
   deriving, via one or more hardware processors, one or more distinct sequence of the activities automatically based on the predefined guard condition from the captured at least one IoT solution specification as flow of activities, wherein the predefined guard condition comprises of one or more conditions composed by at least one logical operator and checking for any missing IoT solution specification; and
   automatically generating, via one or more hardware processors, one or more test specifications for each of the one or more distinct sequence of the activities in form of Test Specification DSL based on the asserted transitions of the captured at least one IoT solution specification as flow of activities.

2. The processor-implemented method claimed in claim 1, wherein deriving the one or more distinct sequence of the activities includes: generating an activity graph from the captured at least one IoT solution specification as flow of activities based on the capability of one or more internet of things (IoT) enabled components; and exploring the generated activity graph to assess one or more distinct activity paths, wherein at least one activity path of the one or more distinct activity paths comprises of a cyclic path or an acyclic path.

3. The processor-implemented method claimed in claim 2, wherein the one or more distinct activity paths are analyzed based on modified condition decision coverage (MCDC) criteria where one condition is modified at a time to identify any missing IoT solution specification.

4. The processor-implemented method claimed in claim 1, wherein generating the one or more test specifications is based on a grey-box testing, wherein the grey-box testing comprises of black-box testing and white box testing.

5. The processor-implemented method claimed in claim 1, wherein the generated one or more test specifications in form of Test Specification DSL are implemented in a predefined target language corresponding to each of the one or more test specifications generated from activity paths.

6. A system comprising:
   at least one memory storing a plurality of instructions;
   at least one user interface;
   one or more hardware processors communicatively coupled with the at least one memory, wherein the one or more hardware processors are configured to execute one or more modules of the plurality of instructions;
   a receiving module configured to receive a plurality of data pertaining to capability of one or more internet of things (IoT) enabled components using a predefined domain specific language (DSL);
   a capturing module configured to capture at least one IoT solution specification as flow of activities comprising of capability of each of the one or more IoT enabled components using a predefined activity DSL that specifies the activities and transitions among the activities based on a predefined guard condition, wherein the capturing asserts the transitions;
   a deriving module configured to derive one or more distinct sequence of the activities automatically based on the predefined guard condition from the captured at least one IoT solution specification as flow of activities, wherein the predefined guard condition comprises of one or more conditions composed by at least one logical operator and checking for any missing IoT solution specification; and
   a generating module configured to automatically generate one or more test specifications for each of the one or more distinct sequence of the activities in form of Test Specification DSL based on the asserted transitions of the captured at least one IoT solution specification as flow of activities.

7. The system claimed in claim 6, wherein the deriving module executes steps of: generating an activity graph from the received plurality of data pertaining to the capability of one or more internet of things (IoT) enabled components; and exploring of the generated activity graph to assess one or more activity paths, wherein at least one activity path of the one or more distinct activity paths comprises of a cyclic path or an acyclic path.

8. The system claimed in claim 7, wherein the one or more distinct activity paths are analyzed based on modified condition decision coverage (MCDC) criteria where one condition is modified at a time to identify any missing IoT solution specification.

9. The system claimed in claim 6, wherein generating the one or more test specifications is based on a grey-box testing, wherein the grey-box testing comprises of black-box testing and white box testing.

10. The system claimed in claim 6, wherein the generated one or more test specifications in form of Test Specification DSL are implemented in a predefined target language corresponding to each of the one or more test specifications generated from activity paths.

11. A non-transitory computer readable medium storing one or more instructions which when executed by one or more processors on a system, cause the one or more processors to perform method comprising:
  receiving, via one or more hardware processors, a plurality of data pertaining to capability of one or more internet of things (IoT) enabled components using a predefined domain specific language (DSL);
  capturing, via one or more hardware processors, at least one IoT solution specification as flow of activities comprising of capability of each of the one or more IoT enabled components using a predefined activity DSL that specifies the activities and transitions among the activities based on a predefined guard condition, wherein the capturing asserts the transitions;
  deriving, via one or more hardware processors, one or more distinct sequence of the activities automatically based on the predefined guard condition from the captured at least one IoT solution specification as flow of activities, wherein the predefined guard condition comprises of one or more conditions composed by at least one logical operator and checking for any missing IoT solution specification; and
  automatically generating, via one or more hardware processors, one or more test specifications for each of the one or more distinct sequence of the activities in form of Test Specification DSL based on the asserted transitions of the captured at least one IoT solution specification as flow of activities.

* * * * *